United States Patent [19]

Shupert

[11] 4,342,187
[45] Aug. 3, 1982

[54] RESONANT SICKLE DRIVE WITH SPRING MEANS AT OPPOSITE ENDS OF THE SICKLE

[75] Inventor: Paul T. Shupert, Milwaukee, Wis.

[73] Assignee: Allis-Chalmers Corporation, Milwaukee, Wis.

[21] Appl. No.: 220,502

[22] Filed: Dec. 29, 1980

[51] Int. Cl.³ ............................................ A01D 55/02
[52] U.S. Cl. ...................................... 56/257; 56/306; 56/299
[58] Field of Search ................. 56/296, 299, 306, 257, 56/258, 259, 260, 261, 262, 263; 74/60, 100

[56] References Cited

U.S. PATENT DOCUMENTS

| | | | |
|---|---|---|---|
| 2,109,085 | 2/1938 | Chilstrom et al. | 56/306 |
| 2,118,792 | 5/1938 | Horton | 74/100 |
| 3,463,018 | 8/1969 | Hale et al. | 74/60 |
| 3,763,639 | 10/1973 | Grillot | 74/60 |
| 3,823,534 | 7/1974 | Bornzin et al. | 56/296 |
| 3,996,806 | 12/1976 | Alexander | 74/60 |

OTHER PUBLICATIONS

"Ingenious Mechanisms for Designers & Inventors", vol. II, p. 382, Fig. 11, 1957.

Primary Examiner—Robert A. Hafer
Attorney, Agent, or Firm—Charles L. Schwab

[57] ABSTRACT

In order to provide a higher cutting speed for a high speed harvester (11) torsion bars (31, 68) are connected to opposite ends of a crop cutting sickle (28). A pair of levers (46, 62) which connect the torsion bars (31, 68) to the sickle (28) carry a pair of removable counterweights (56, 96) which can be sized to change the resonant frequency to substantially correspond to the desired cutting speed. The levers (46, 62) may be interconnected by an adjustable tie bar (111) for hard to cut crops which is of sufficient mass to replace the counterweights; or, counterweights (156, 196) may be added to adjust the resonant frequency and hence the resonant cutting speed.

13 Claims, 9 Drawing Figures

RESONANT SICKLE DRIVE WITH SPRING MEANS AT OPPOSITE ENDS OF THE SICKLE

FIELD OF INVENTION

This invention relates to crop cutting harvester and more particularly, to a mechanism for driving a reciprocating cutter or sickle bar at relatively high speeds.

BACKGROUND OF THE INVENTION

There has been a trend over the past several years to provide agricultural combines of greater threshing capacity. While the size of combines has been increased over earlier designs, there is a practical limit to physical increases in size of the crop cutting header portion of the combines.

The productivity of large capacity combines may be increased by operating at a higher ground speed, which requires a higher cutter speed. In the case of a reciprocating sickle type cutter, the inertia related forces in the cutter mechanism increase with the square of the frequency of reciprocation. The present invention is directed to providing a cutting mechanism which operates at high speed without imposing unduly high forces on its drive mechanism. An effort in this direction is the provision of a resonant cutting mechanism shown in a copending U.S. patent application Ser. No. 186,571 by Larry F. Stikeleather and Tony L. Kaminski filed Sept. 12, 1980 for Resonant Sickle Drive. In the resonant sickle drive of the before-mentioned patent application the resonant frequency of the cutting mechanism is within the reciprocating frequency range at which the sickle normally operates for crop cutting purposes. Operating the spring coupled sickle bar, at or near its resonant frequency, results in a greatly reduced input peak torque requirement. Also, the lower peak forces are expected to result in longer operating life of drive components.

Heretofore, others have suggested the use of multiple resilient spring devices for cushioning or for storing and releasing energy during reciprocation of a cutting device. Several such arrangements are shown in U.S. Pat. Nos. 273,341; 2,109,085; 3,538,690 and 3,624,990.

BRIEF DESCRIPTION OF THE INVENTION

A pair of torsion bars of predetermined spring rate are connected to opposite ends of a reciprocating sickle of a harvester. The torsion springs are especially selected or designed, so when used in conjunction with the sickle and its drive mechanism, the reciprocating and oscillating system so formed will be operating near a resonant frequency when the sickle is reciprocated at its normal crop cutting frequency. The torsion bars are preferably connected to the sickle by a pair of parallel levers pivotally connected to a support for oscillation about a pair of parallel oscillating axes transverse to the direction of operation of the sickle. Provision may be made for detachably connecting counterweights to the ends of the levers remote from their connections with the sickle. The selected counterweight mass may vary with the length of the sickle. The remote ends of the levers may be interconnected with a tie bar in which event the weight of the counterweights may be reduced or the counterweights may be eliminated.

Preferably the torsion bar has zero stored energy at the midpoint of reciprocation of the sickle and stores energy as the sickle bar moves in either direction from midpoint to the end of its stroke. The torsion bar releases its energy to the sickle bar as the sickle bar moves from the end of its stroke to the midpoint of its stroke. During a normal cutting operation, a tension force will be present at one end of the sickle and a compression force will be present at the other end thereby producing virtually zero force in the sickle at its midpoint.

The use of a torsion bar at each of the opposite ends of the sickle permits the sickle to be successfully operated at a resonant frequency considerably higher than practically feasible using the mechanism of the before-mentioned copending U.S. patent application.

DETAILED DESCRIPTION OF THE DRAWINGS

Figure 1:
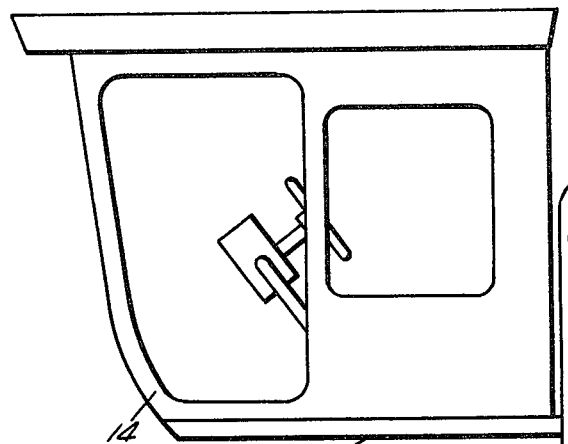
FIG. 1 is a side view of a harvester or combine.
Figure 1:
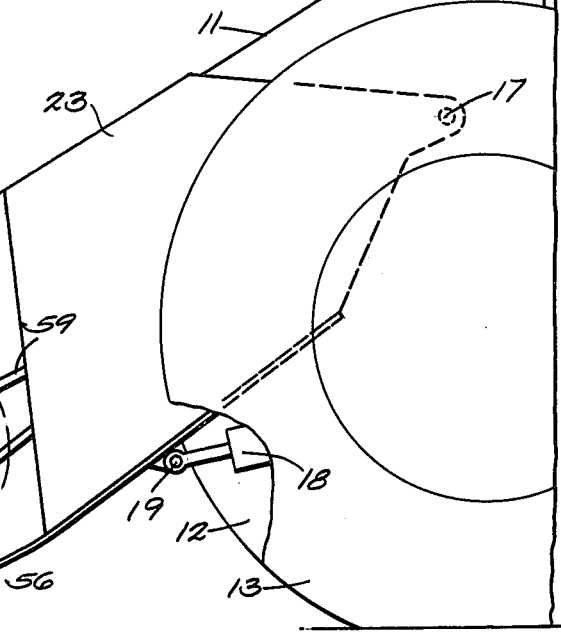

Referring to FIG. 1, the combine 11, in which the present invention is incorporated, includes a pair of front wheels 12, 13, an operator's cab 14 and a header 16 pivotally connected to the main frame of the combine on a transverse pivot axis 17 for vertical swinging movement in response to expansion and contraction of a hydraulic jack 18 pivotally connected by a transverse pivot pin 19 to the bottom part of the header 16. The header 16 includes a transverse auger 21, which moves the material cut by a crop cutting mechanism 22 laterally toward the central part of the header, where it is conveyed upwardly and rearwardly through a feeder portion 23 to the threshing section of the combine. The crop cutting mechanism 22 includes a wobble drive mechanism 26 and a torsion bar device 27 which are interconnected to one another and to the horizontally reciprocating sickle 28 of the cutting mechanism 22 in the manner shown in the hereinbefore-mentioned copending U.S. patent application Ser. No. 186,571.

Figure 2:
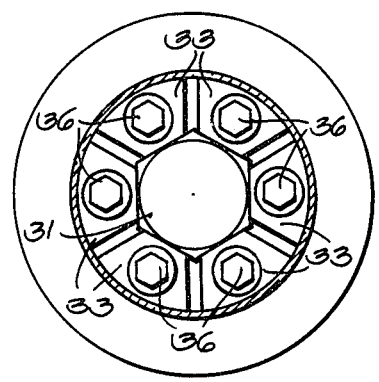
FIG. 2 is a view taken along the line II—II in FIG. 1.
Figure 3:
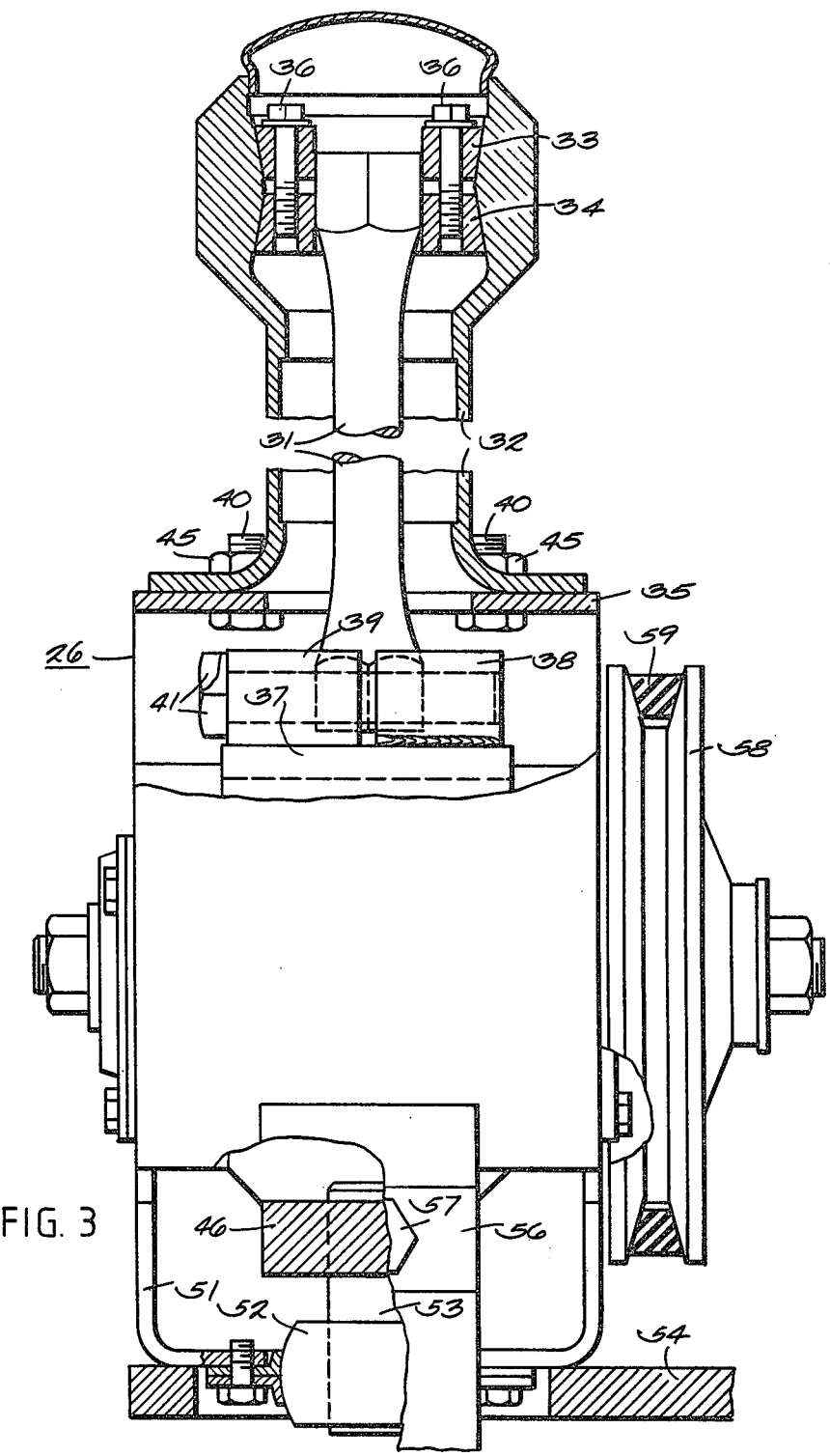
FIG. 3 is a rear view of a combine wobble drive and torsion bar mechanism at the driven end of the sickle with parts broken away for illustration purposes.

As shown in FIGS. 2 and 3, an upright torsion bar 31 has its upper end rigidly secured to the upper end of a stationary mounting tube 32 by releasable fastening means in the form of two series of tapered clamping segments 33, 34 secured together by cap screws 36. The lower end of the tube 32 is secured to a housing 35 of the wobble drive 26 by bolts 40 and nuts 45. The hex-shaped lower end of the torsion bar 31 is rigidly secured to the top of a U-shaped member 37 of an oscillating lever assembly by a split clamp having a fixed part 38 welded to the member 37 and a removable part 39 releasably secured to the fixed part 38 by a pair of cap screws 41. The lower ends of the depending legs of the U-shaped member 37 are welded to the top of a lever 46 whose forward projecting end is pivotally connected to a sickle bar 47 of the sickle 28. The lever 46 is pivotally connected to a stationary support member 51 by a spherical bearing 52 and pin 53. The support member 51 is rigidly fastened to a header frame member 54 by suitable means, not shown. A counterweight 56 of predetermined weight is releasably secured to the rear end of the lever 46 by a cap screw 57. The wobble drive 26 includes an input pulley 58 driven by a V-belt 59.

Figure 5:
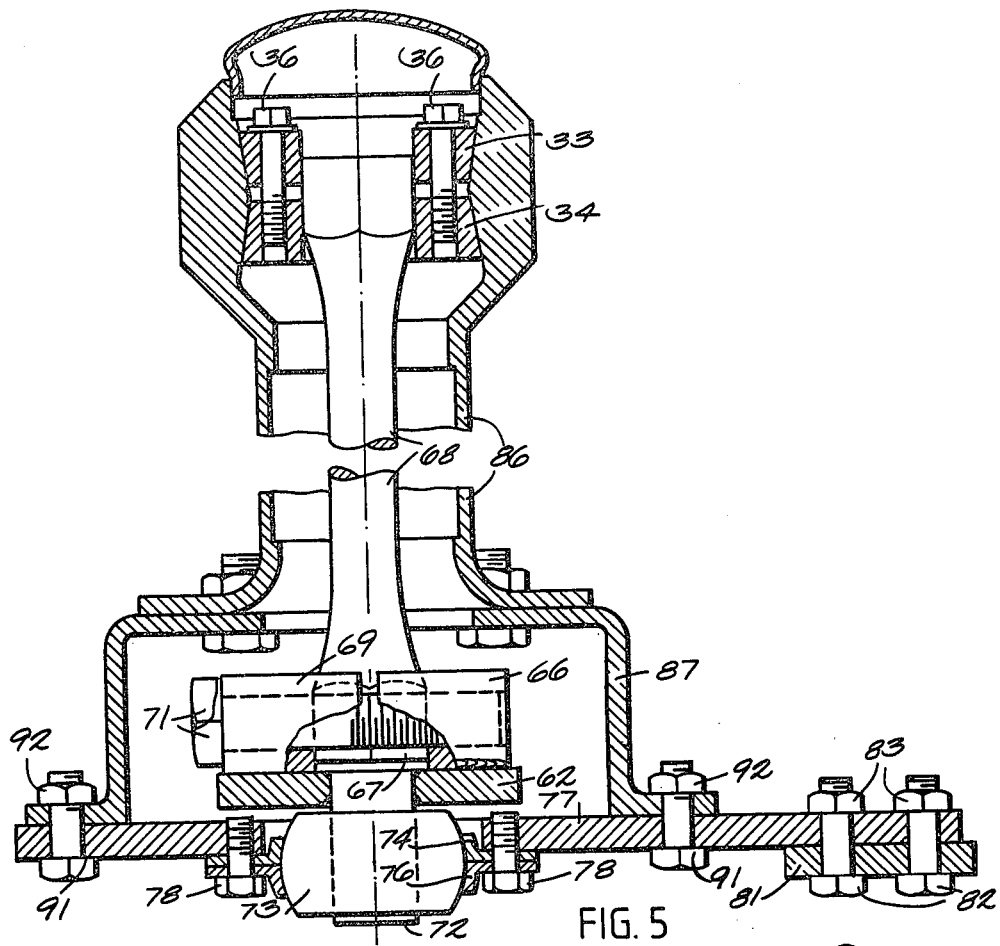
FIG. 5 is a view taken along the line V—V in FIG. 4.
Figure 4:
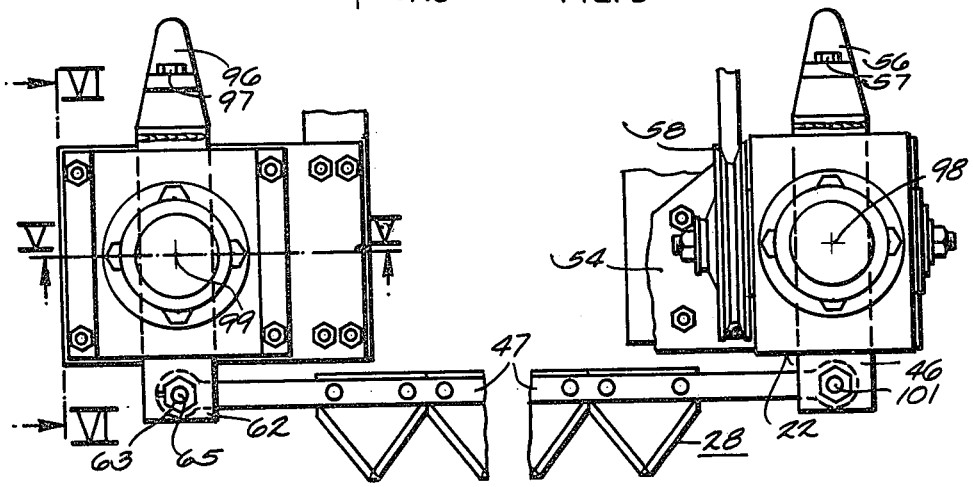
FIG. 4 is a partial top view of the harvester showing the torsion bar installations at opposite ends of the sickle.
Figure 6:
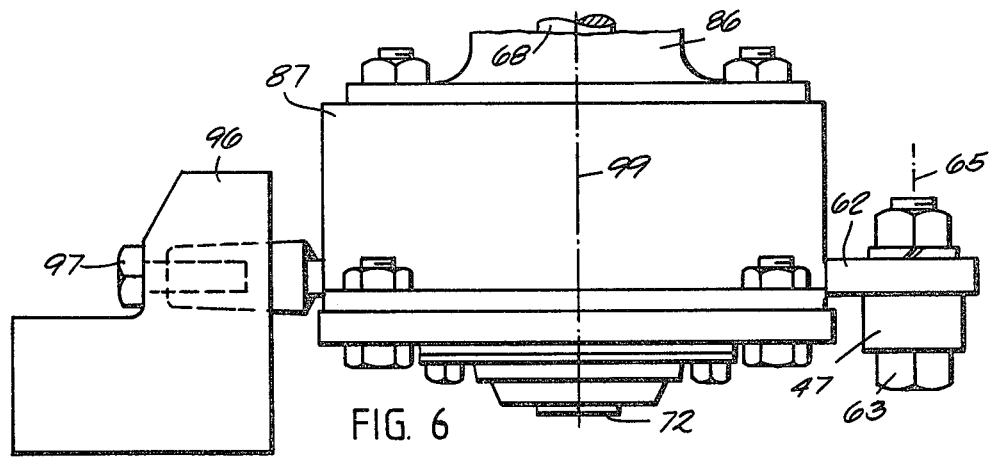
FIG. 6 is a view taken along the line VI—VI in FIG. 4.

As shown in FIGS. 4, 5 and 6, the nondriven end of the sickle bar 47 is connected to the front end of a counterweighted lever 62 by a suitable pivot bolt 63 for pivotal movement about an upright axis 65. The central part of the lever 62 is welded to a fixed part 66 of a split clamp, which serves to rigidly but releasably secure the lever 62 to a hexed portion 67 of a torsion bar 68 through a part 69 releasably secured to part 66 by a pair of cap screws 71. A downwardly depending vertical pin 72 is welded to the bottom of the lever 62 and is mounted in a spherical bearing 73 whose mounting brackets 74, 76 are secured to a stationary support 77 by cap screws 78. The support 77 is rigidly secured to the header frame part 81 by bolts 82 and nuts 83. The upper hexed end of the torsion bar 68 is nonrotatably secured to the upper end of a support tube 86 by releasable clamping means in the form of wedging segments 33, 34 drawn toward one another by cap screws 36. The lower end of the tube is rigidly secured to an inverted U-shaped support member 87 and the support member 87 is rigidly secured to support 77 by bolts 91 and nuts 92. As shown in FIGS. 4 and 6, a counterweight 96 is secured by a cap screw 97 to the rear end of the lever 62.

The parallel torsion bars 31, 68 are aligned, respectively, with the pivot axes 98, 99 of the pivot pins 53, 72 and in their neutral or midstroke position, shown in FIG. 4, they are not loaded, and hence, are not in an energy or torque storing condition. The distance between the axis 98 of pivot pin 53 and the axis 101 of the pivot bolt 102 is the same as the distance between axis 99 and axis 65. Preferably, the distance between axis 98 and axis 99 is equal to the distance between axis 101 and axis 65 and in the neutral or midstroke position of the sickle 28 the upright axes 65, 99, 98, 101 define a rectangle.

The use of a torsion bar at each end of the sickle with appropriate counterweights provides an efficient resonant sickle mower or harvester for operating speeds higher than those for a sickle torsion bar resonant sickle drive. More specifically, the twin torsion bar resonant sickle drive of this invention can be effectively operated at 880 revolutions per minute (rpm) of the wobble drive. Each revolution of the wobble drive effects one cycle of sickle reciprocation which affords two cutting strokes—one in a first direction and one in a second (opposite) direction. A cutting speed of 880 rpm is considered to be above the practical cutting speed range of a single torsion bar resonant sickle drive. The twin or dual torsion bar sickle drive of this invention permits considerable flexibility in design of a resonant sickle drive system having optimum sickle force distribution at high sickle speeds by selection of counterweights and torsion bars so the typical or expected cutting force for crops being cut results in nearly balanced opposed forces acting on the sickle in the path of its reciprocation (in the longitudinal axis of the sickle bar 47). Ideally, the internal longitudinal stress in the sickle bar 47 at its midpoint during near resonant operation is substantially zero, in which condition one end of the sickle is being pulled while the other end of the sickle is being pushed. Thus, with this invention, it is possible to obtain high speed cutting without excessive vibration, which can be expected to result in long life for sickle drive components and reduced torque fluctuations.

Figure 7:
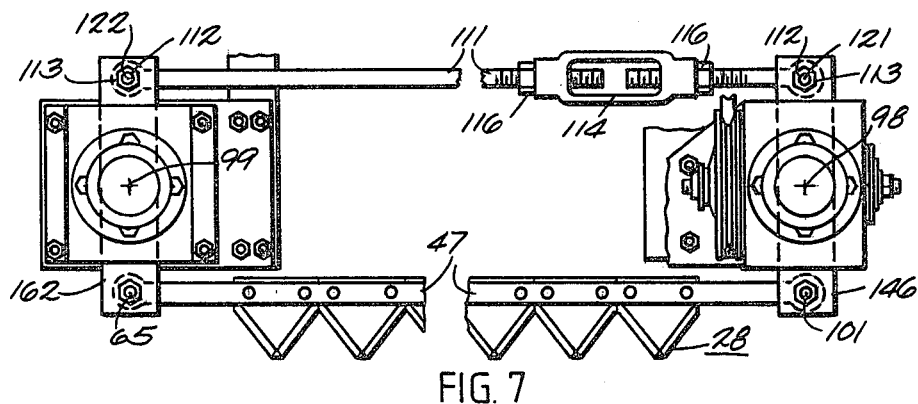
FIG. 7 is a partial top view showing a second embodiment of the present invention.

Referring to the second embodiment of the invention shown in FIG. 7, the opposite ends of a tie bar 111 are pivotally connected by bolts 112 and nuts 113 to the rear ends of levers 146, 162 at equal distance from torsion bar axes 99, 98, which are also the pivot axes of the levers 146, 162. The tie bar 111 includes suitable means for adjusting its length for initial installation, such as a turnbuckle 114 which is releasably locked in place by lock nuts 116. In the embodiment of the invention illustrated in FIG. 7, the tie bar 111 is of the same mass as the sickle 28 and the axes 121, 122 are spaced rearwardly of the pivot axes 98, 99 a distance equal to the spacing of the axes 101, 65 forwardly of the pivot axes 98, 99, thus providing the desired counterweight means for resonant sickle operation at a predetermined sickle drive speed. The embodiment of the invention, shown in FIG. 7, is believed to have particular utility in cutting crops offering high cutting resistance (requiring high cutting force). The tie bar 111 substantially eliminates buckling of the sickle bar 47 of the sickle, thus preventing the vibration and the increased stress associated with vertical flexing of the sickle bar.

Figure 9:
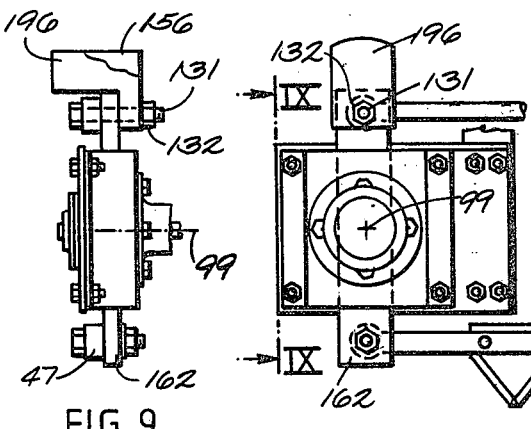
FIG. 9 is a view taken along the line IX—IX in FIG. 8.
Figure 8:
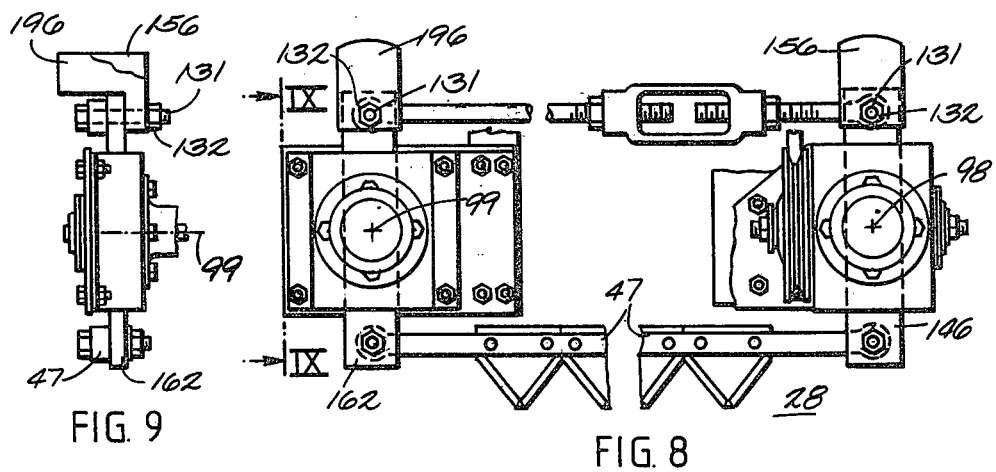
FIG. 8 is a partial top view showing a third embodiment of the present invention.

The tie bar embodiment of the invention, shown in FIG. 7, has a predetermined resonant operating speed; however, an operator may wish to cut some crops at a different cutting speed. FIGS. 8 and 9 show the third embodiment of the invention, wherein removable counterweights 156, 196 have been releasably secured to the rear ends of the levers 146, 162 by bolts 131 and nuts 132. By selecting different size counterweights, the resonant speed of cutting can be selected to obtain the ideal cutting speed for a particular crop. Thus, the FIG. 8 embodiment of the invention can be adjusted for operation at different operating speeds by use of appropriate weight counterweights 156, 196 and is particularly useful in harvesting equipment used to cut crops requiring varying cutting forces and speeds.

The embodiments of the invention in which an exclusive property or privilege is claimed are defined as follows:

1. A drive mechanism for reciprocating an elongated sickle of a harvester comprising
    a pair of substantially parallel levers extending generally transverse to the direction of reciprocation of said sickle and having first corresponding ends pivotally connected, respectively, to opposite ends of said sickle,
    means pivotally supporting said levers intermediate their opposite ends for movement about parallel oscillation axes generally transverse to said direction of reciprocation of said sickle,
    power means operatively connected to said sickle causing reciprocation thereof and oscillating movement of said levers about said oscillation axes,
    a pair of elongated upright torsion bars in alignment with said oscillation axes, respectively
    means rigidly securing first corresponding ends of said torsion bars to said levers for pivotal movement therewith about said oscillation axes, and
    means nonrotatably supporting second corresponding ends of said torsion bars, said torsion bars storing energy as the sickle is moved from the midpoint of its stroke to the end of its stroke and releasing stored energy as the sickle returns from the end of its stroke to the midpoint of its stroke.

2. The drive mechanism of claim 1 wherein said torsion bars have predetermined spring rates so the resonant frequency of the sickle and its oscillating driving mechanism falls within a desired high speed operating range of frequencies of reciprocation of the sickle during a crop cutting operation.

3. The drive mechanism of claims 1 or 2 wherein said levers include a counterweight portion on second corresponding ends thereof remote from said first ends.

4. The drive mechanism of claims 1, 2 or 3 and further comprising a tie bar disposed parallel to said sickle and having its opposite ends pivotally connected to second corresponding ends of said levers.

5. A crop cutting device for a harvester comprising:
a support,
an elongated sickle horizontally reciprocable in its direction of elongation,
drive means for reciprocating said sickle,
a pair of spaced parallel levers extending generally transverse to said sickle,
means connecting first corresponding ends of said levers to opposite ends, respectively, of said sickle,
means pivotally connecting intermediate portions of said levers to said support for movement about a pair of parallel oscillation axes spaced from said sickle,
a pair of parallel torsion bars of rod-like configuration and
means nonrotatably securing opposite ends of said torsion bars to said support and levers, respectively, the resonant frequency of said sickle and oscillating elements connected thereto falling within a predetermined high speed range of operating frequencies of reciprocation of said sickle during a crop cutting operation.

6. The cutting device of claim 5 wherein said torsion bars are coaxial, respectively, with said oscillation axes.

7. The cutting device of claim 6 wherein said drive means is operatively connected to one of said levers to cause the latter to oscillate about one of said oscillation axes.

8. The cutting device of claim 7 wherein said drive means includes a wobble drive mechanism having a rotary input shaft and an oscillating output member, said oscillating output member being secured to said one lever so as to oscillate coaxially therewith.

9. The cutting device of claims 5, 6, 7 or 8 and further comprising a pair of counterweights secured, respectively, to second corresponding ends of said levers.

10. The cutting device of claims 5, 6, 7 or 8 and further comprising a tie rod disposed parallel to said sickle and having its opposite ends pivotally connected, respectively, to second corresponding ends of said levers.

11. The cutting device of claims 5, 6, 7 or 8 and further comprising a tie bar disposed parallel to said sickle and having its opposite ends pivotally connected, respectively, to second corresponding ends of said levers and a pair of counterweights connected, respectively, to said second corresponding ends of said levers.

12. The cutting device of claims 5, 6, 7 or 8 wherein said torsion bars are in generally upright positions.

13. The cutting device of claims 5, 6, 7 or 8 in which the sickle has virtually zero internal force at its midpoint during a normal crop cutting operation.

* * * * *